Oct. 13, 1925.  
V. C. DE YBARRONDO  
1,556,766  
DEVICE FOR MEASURING THE OPACITY OF TRANSLUCENT MATERIALS  
Filed Oct. 24, 1921
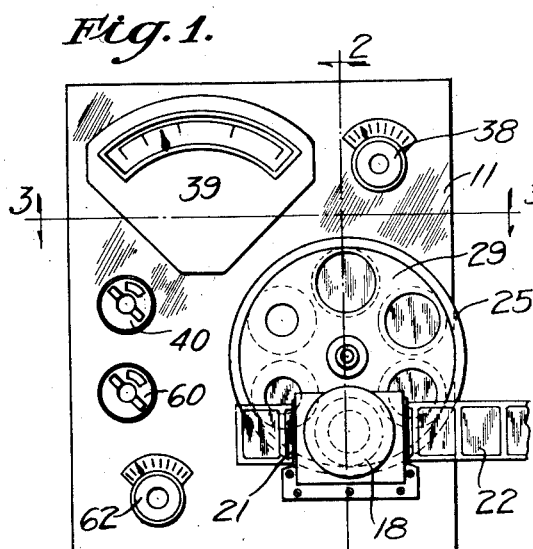
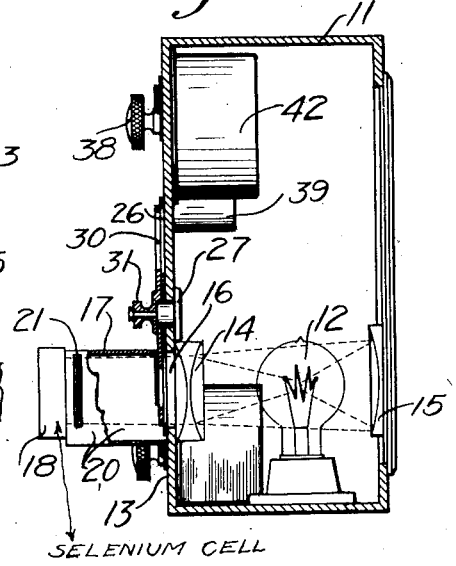
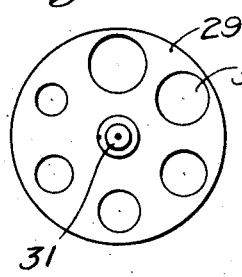
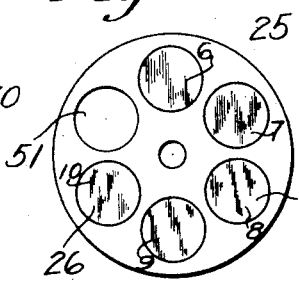
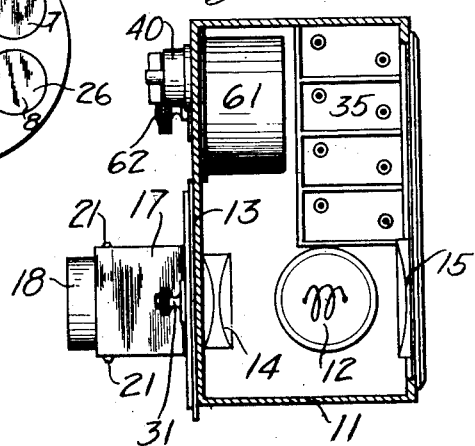
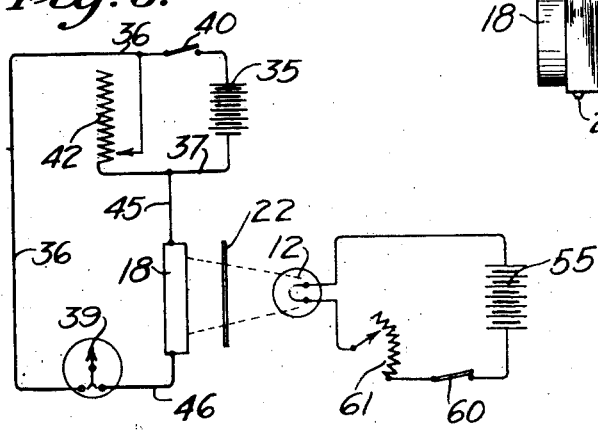
INVENTOR:  
VINCENT C. DE YBARRONDO,  
BY Graham Harris  
ATTORNEYS.

Patented Oct. 13, 1925.

1,556,766

UNITED STATES PATENT OFFICE.

VINCENT C. DE YBARRONDO, OF LOS ANGELES, CALIFORNIA.

DEVICE FOR MEASURING THE OPACITY OF TRANSLUCENT MATERIALS.

Application filed October 24, 1921. Serial No. 509,875.

*To all whom it may concern:*

Be it known that I, VINCENT C. DE YBARRONDO, a citizen of the United States, residing at Los Angeles, in the county of Los Angeles, and State of California, have invented a new and useful Device for Measuring the Opacity of Translucent Materials, of which the following is a specification.

This invention relates to devices for measuring the light permeability of translucent materials, and is particularly applicable to use in standardizing the degree of exposure and development to which photographic film and plates are subjected.

It is the object of my invention to provide a device of this nature in which a light of a predetermined intensity may be projected through a photographic film and received by a selenium cell in circuit with a suitable registering instrument in order to indicate the opacity of the film by referring to the change in conductivity in the selenium cell as noted on the registering instrument.

It is also an object of my invention to provide a means for compensating for the changeable characteristics of selenium cells thereby assuring reliability in the indicating elements of the device.

It is also a further object of my invention to provide a device for determining the thickness or condition of the emulsion coating upon films.

In the manufacture of motion picture film, success in producing an article of standardized quality is wholly dependent upon the skill and judgment of the operators performing the different operations through which the production of motion picture film must be carried.

I attain the object of my invention in the provision of an apparatus which may be used in connection with the developing and printing of motion picture films by which it is possible to measure and indicate the opacity of the film at different points in the process of their manufacture, thereby making it possible for the operators to adjust such instruments as they may be using with the result that the film produced may be caused to adhere to certain predetermined standards and assuring a uniform production.

Referring to the drawing which is diagrammatic and for illustrative purposes only:

Fig. 1 is a front elevation of a device embodying my invention.

Fig. 2 is a vertical section taken substantially upon a plane represented by the line 2—2 of Fig. 1.

Fig. 3 is a longitudinal section taken substantially upon a plane represented by the line 3—3 of Fig. 1.

Fig. 4 is a face view of a disk provided with holes of different diameters to regulate the area of the shaft of light projected through the material, the opacity of which is to be measured.

Fig. 5 is a face view of the disk I employ having permeable diaphragms through which the light is first projected upon the selenium cell to bring the indicating instrument into agreement with the light susceptibility of the cell.

Fig. 6 is a diagram of the electric connections employed in this apparatus.

In the construction of the device shown in the drawing, I employ a substantially light tight box 11 in which is mounted an incandescent light 12. The front wall 13 of the box 11 mounts a condenser 14 to operate in conjunction with a reflector 15, mounted behind the incandescent globe 12 by rectifying the light rays before they are passed through an opening 16 in the front 13 of the box. Upon the front 13 of the box I mount a horizontal shaft 17 through which the light rays may be projected against a selenium cell 18 mounted at the outer end of the shaft. In the side walls 20 I provide openings 21 through which a portion of motion picture film 22 may be passed and interposed between the source of light 12 and the selenium cell 18 so that the light rays will be passed therethrough and tempered in accordance with the opacity of the film before falling upon the surface of the selenium cell.

It is a well known fact that, although the subjecting of a selenium cell to light rays causes same to become an electrical current conductor and also an increase in the intensity of the light to which the selenium cell is subjected is accompanied by a decrease in the resistance of the cell, that the susceptibility of the cell fluctuates within certain limits and therefore cannot be entirely depended upon to maintain a steady condition of conductivity throughout a considerable number of readings. In order to compensate for this unreliable characteristic of selenium, I provide a means of checking its conductivity at different times throughout its period of use, and of varying the potential of the current in which it is placed in circuit to cause the amount of current passing therethrough to indicate the desired reading upon the dial of a galvanometer.

To accomplish this purpose I provide a disk 25 having a number of translucent screens 26 placed therein and journaled upon the front 13 of the box on a journal 27 so that any of the screens 26 may be brought before the opening 16 by grasping the disk by its right edge, which overhangs the right edge of the box 11, and rotating the disk.

Mounted in conjunction with the disk 25 I provide a disk 29 having holes 30 therein journaled on the journal 27 and which may be revolved to bring the desired opening 30 before the opening 16 by manipulating a knob 31. The openings 30 are of different sizes for admitting different amounts of light, from the lamp 12 to the cell 18, which amounts of light correspond to the opacities of different films developed to different degrees. The screens 26 are numbered from 6 to 10 or otherwise as desired and have different opacities to correspond to the degrees to which the various films are developed. In circuit with the selenium cell 18 I provide a suitable number of battery cells 35, connected in series to give the desired voltage. Across the conductors 36 and 37 leading from the electric current source 35 I place a variable resistance 42 which is mounted in the inside of the box 11 and may be operated through an exterior knob 38. The conductor 36 makes connection with one side of a galvanometer 39 and it has placed therein a switch 40. From the conductor 37 connection is made to the cell 18 by a conductor 45 and the circuit is completed between the cell and the galvanometer 39 through a conductor 46.

When it is desired to develop a batch of film to any certain degree such as represented by the opacity of one of the screens 26, that designated as 8 being selected for the purpose of demonstrating the operating of my device, the disk 25 is revolved to bring the screen 8 before the opening 16 while the disk 29 is adjusted so that its largest opening 30 registers with said opening 16 and light from the incandescent globe 12 is projected therethrough upon the selenum cell. The galvanometer 39 is graduated to give direct readings of the different opacities; and, if the condition of the cell 18 causes the pointer 50 to indicate either above or below the number 8 corresponding to the opacity of the screen 8 being used, the voltage of the circuit in which the indicating elements are placed is varied by adjusting the resistance 42 which varies the load upon the current source 35 so that the internal resistance drop of the cells may be varied to give the desired voltage to bring the pointer 39 to the desired point upon the dial. The disk 25 is then revolved to bring the unobstructed opening 51 before the opening 16 and the device is now ready for making a certain number of tests upon the film being developed. I have found that fifteen or twenty readings may be taken before the selenium cell changes sufficiently in its conductivity to require another adjustment of the galvanometer reading.

After a negative film has been developed, it is placed in my invention in which the opacity of the different portions thereof is measured. The film is inserted endwise through the horizontally extending opening 21. The light from the lamp 12 passes through the condenser 16 and through the screen 8 which controls the passage of light to the film 22. The shaft of light from the screen 8 passes through the film 22 and onto the selenium cell 18. The light impressions which pass through the film affect the selenium cell and cause a fluctuation of the galvanometer 39. The fluctuations at different portions of the film may be noted directly upon the film or on a separate card. When positive films are made from the negative, the light of the printer is adjusted in compliance with the readings of the device of my invention. This makes it possible to produce a positive film of uniform density even though the density of the negative film varies somewhat.

The incandescent light 12 may be placed in circuit with a battery 55 as indicated in Fig. 6 or it may be connected up with the standard 111 volt light service depending upon the incandescent globe used or the conditions under which the instrument is being used. In circuit with the light 12 I use a switch 60 and a rheostat 61 so that the intensity of the light delivered by the filament of the globe 12 may be adjusted as desired. The rheostat 61 may also be operated through a knob 62 conveniently mounted upon the front 13 of the box 11. The disk 29 performs the same function as the disk 25, the different sized openings 30 taking the place of the screens 6 to 10 inclusive. The disk 25 may be used alone or with the disk 29 to vary the area and amount of light passing through the screens of the latter disk.

With the use of my device it is possible to bring an output of motion picture film to any predetermined degree of development thus eliminating the enormous wastage that is now encountered in the production of motion picture film due to the under or over development thereof. For use in determining the thickness of the emulsion coating of unexposed films for the purpose of finding the correct exposure to employ I use a red bulb 12 instead of a clear globe as previously described.

I claim as my invention:

1. In a device for measuring the opacity of translucent substances, the combination of: a cell of changeable resistance under the influence of light rays; a luminous body; means for interposing a body of translucent substance between said cell and said luminous body; a source of electric current in circuit with said cell; an indicating instrument in said circuit; and a variable resistance shunted across said source of electric current to form a branch circuit of variable resistance for controlling the flow of electric current in the circuit of said cell.

2. In a device for measuring the opacity of photographic film, the combination of: a selenium cell; means for throwing a shaft of light upon said cell; means for interposing a film to be tested in the path of said light; means for interposing a translucent body of specified opacity in the path of said light; a battery in circuit with said cell; a galvanometer in said circuit; and a variable resistance shunted across said battery to vary the current value in said circuit so as to compensate for a change in the susceptibility of said cell.

In testimony whereof, I have hereunto set my hand at Los Angeles, California, this 17 day of October, 1921.

VINCENT C. de YBARRONDO.